United States Patent Office 3,340,019
Patented Sept. 5, 1967

3,340,019
PROCESS FOR THE REPROCESSING OF IRRADIATED COMPACT FUELS BY FLUORINATION
Giancarlo Pierini, Mol, Aldo Francesconi, Turnhout, and Jean Schmets, Mol-Donk, Belgium, assignors, by mesne assignments, to the United States of America as represented by the United States Atomic Energy Commission
No Drawing. Filed Nov. 15, 1966, Ser. No. 594,634
Claims priority, application Luxembourg, Nov. 26, 1965, 49,937
5 Claims. (Cl. 23—326)

ABSTRACT OF THE DISCLOSURE

Chlorine trifluoride mixed with fluorine and nitrogen is used for converting compact nuclear fuels composed of uranium dioxide into uranium hexafluoride.

---

The object of this invention is a process for the reprocessing of irradiated compact nuclear fuels by fluorination, such fuels being, in particular, substances chosen from the group comprising uranium dioxide with plutonium oxide and fission products, plutonium mono- or bi-carbide and fission products, uranium carbides with thorium carbides and fission products. The fluorinating agent is a gaseous mixture composed of fluorine and chlorine trifluoride. In one advantageous form, chlorine trifluoride mixed with fluorine is chosen for converting uranium compounds, particularly oxides, into uranium hexafluoride.

The said uranium compounds treated in this way are transformed into volatile uranium hexafluoride. If the uranium compounds are mixed with plutonium compounds, the latter are only converted into non-volatile plutonium tetrafluoride, the uranium hexafluoride being separated from the plutonium tetrafluoride and from the fission products. The plutonium tetrafluoride is then transformed into plutonium hexafluoride by means of fluorine, the plutonium hexafluoride being separated from the fission products. When the fuel consists of compact carbides or dioxide of uranium and plutonium or thorium, the chlorine trifluoride has the characteristic of enabling volatile uranium hexafluoride to be obtained in one single cycle, without requiring prior pulverisation treatment.

The present invention refers to a new direct process for chemically attacking compact irradiated fuels by using a mixture of fluorine and chlorine trifluoride.

The result of this invention is an appreciable improvement in the chemical conversion rate and the fluorine yield. When nuclear fuels are attacked directly by chlorine trifluoride, the fluorine yields and reaction rates attain different values depending on the operational conditions chosen. In this case the fluorination reaction: uranium dioxide→uranium hexafluoride gives chlorine and chlorine monofluoride as reaction products.

The purpose of adding fluorine to the chlorine trifluoride is the reconversion "in situ" of the chlorine and chlorine monofluoride into chlorine trifluoride which, at the same time, again takes part in the reaction by also increasing either the fluorine yield or the reaction rate.

The effect of adding fluorine is favorable to the reaction rate whatever the temperature between 25 and 500° C. In one particularly advantageous form of implementation, the nearer the reaction temperature gets to the temperature at which the equilibrium of the following reactions is displaced to the right, the faster the fluorination reaction.

(1) $ClF + F_2 = ClF_3$
(2) $Cl_2 + F_2 = 2ClF$
(3) $Cl_2 + 3F_2 = 2ClF_3$

Furthermore, at temperatures above 280° C., at which the $ClF_3$ begins to decompose, the addition of fluorine also displaces Equations 1 and 2 towards chlorine trifluoride formation. Obviously, the uranium dioxide fluorination rate and the fluorine yield depend on the quantity of fluorine added.

"Fluorine yield" as used herein means the relative amount of fluorine that is converted to $UF_6$.

It is best to add the quantity of fluorine necessitated by the reconversion of chlorine and chlorine monofluoride into chlorine trifluoride for the operational conditions chosen.

Uranium separation from plutonium when using a gaseous chlorine trifluoride and fluorine mixture is still possible, because the fluorine does not take part in the reaction until after its conversion into chlorine trifluoride, as a result of the presence of chlorine and chlorine monofluoride in the reactive gases mixture.

In addition, the presence of fluorine makes it possible to destroy the dangerous $Cl_2O$ and $ClO_2$ compounds which are liable to form under certain conditions.

The invention is illustrated by the following examples made in a vertical reactor, the uranium dioxide being placed on a filter distributing the gases used in the reaction.

Example 1

504 grams of uranium dioxide, in pellets 14 mm. in diameter, reacted at 200° C. with 55 liters per hour of chlorine trifluoride and 15 liters per hour of fluorine diluted with 30 liters per hour of nitrogen for 115 minutes. The quantity of fluorine involved is equal to that of 65 liters per hour of chlorine trifluoride. The reaction rate was 3.74 grams per minute and the fluorine yield was 61.2%.

Compared with a test using 70 liters per hour of chlorine trifluoride and 130 liters per hour of nitrogen, there was a 4.28% increase in the reaction rate and 12% increase in the fluorine yield.

Example 2

994 grams of uranium dioxide, in pellets 14 mm. in diameter, reacted at 300° C. with 40 liters per hour of chlorine trifluoride and 15 liters per hour of fluorine diluted with 145 liters per hour of nitrogen for 160 minutes. The quantity of fluorine involved was equal to that of 50 liters per hour of $ClF_3$. The reaction rate was 4 grams per minute and the fluorine yield was 85%.

Compared with a test using 50 liters per hour of chlorine trifluoride diluted with 150 liters per hour of nitrogen, there was an 11% increase in the reaction rate and fluorine yield.

Example 3

999 grams of uranium dioxide, in pellets 7.5 mm. in diameter, reacted at 300° C. with 55 liters per hour of chlorine trifluoride and 15 liters per hour of fluorine diluted with 130 liters per hour of nitrogen for 80 minutes. The quantity of fluorine involved is equal to that of 65 liters per hour of chlorine trifluoride. The reaction rate was 4.189 grams per minute and the fluorine yield was 68.5%.

Compared with a test using 70 liters per hour of chlorine trifluoride diluted with 130 liters per hour of nitrogen, i.e. with 7.5 liters per hour more fluorine, the fluorine yield increased by 4.3% and the reaction rate remained the same.

Example 4

998 grams of uranium dioxide, in pellets 7.5 mm. in diameter, reacted at 300° C. with 59 liters per hour of chlorine trifluoride and 17 liters per hour of fluorine diluted with 130 liters per hour of nitrogen for 115 minutes.

The quantity of fluorine involved is equal to that of 70 liters per hour of chlorine trifluoride. The reaction rate was 6 grams of $UO_2$ per minute and the fluorine yield was 92%.

Compared with a test using 70 liters per hour of chlorine trifluoride diluted with 130 liters per hour of nitrogen, the fluorine yield and reaction rate increased by 8%.

We claim:

1. A process for the reprocessing of compact irradiated nuclear fuels consisting substantially completely of uranium dioxide by fluorination, which comprises heating said fuels in a gaseous mixture consisting of nitrogen, fluorine and chlorine trifluoride.

2. A process according to claim 1 in which the fluorination reaction by the said mixture is effected at a temperature between 25 and 500° C.

3. A process according to claim 2, in which the temperature is between 100 and 300° C.

4. A process according to claim 1 in which the fluorine concentration in the mixture is 96% at the most, in relation to the chlorine trifluoride.

5. A process according to claim 4, in which the fluorine concentration is between 5 and 50% in relation to the chlorine trifluoride.

References Cited
UNITED STATES PATENTS

| | | | |
|---|---|---|---|
| 3,088,800 | 5/1963 | Johnson et al. | 23—326 |
| 3,294,493 | 12/1966 | Jonke et al. | 23—326 X |

BENJAMIN R. PADGETT, *Primary Examiner.*

L. DEWAYNE RUTLEDGE, *Examiner.*

S. TRAUB, R. L. GRUDZIECKI, *Assistant Examiners.*